HIGH PERFORMANCE TAPE TRANSPORT

Filed Oct. 27, 1964

INVENTORS
BEN C. WANG
STEPHEN T. CHAI

BY

Robert G. Clay

ATTORNEY

United States Patent Office 3,375,963

Patented Apr. 2, 1968

3,375,963

HIGH PERFORMANCE TAPE TRANSPORT

Ben C. Wang and Stephen T. Chai, Los Angeles, Calif., assignors to Ampex Corporation, Redwood City, Calif., a corporation of California Filed Oct. 27, 1964, Ser. No. 406,737
6 Claims. (Cl. 226—178)

This invention relates to high performance digital magnetic tape transports and particularly to tape path arrangements for such systems.

Magnetic tape transports are widely used in conjunction with high speed digital computers for storing and delivering data. In order to utilize the high speed capabilities of available digital computers, it is necessary to move a magnetic tape past recording and readout tape heads at high speeds. High acceleration and deceleration rates are also required because data transfer is intermittent, and cannot begin until the tape is at a nominal operating speed.

One of the most advanced forms of tape transports, for achieving closely controlled tape movement at high accelerative levels, employs a single bidirectionally driven capstan which is itself started and stopped. This may be referred to as a controlled capstan drive. The tape path extends about the capstan and as the capstan rotates it moves the tape past a tape head where data transfer occurs. A vacuum buffer or other buffer means provides low, balanced tension to hold the tape in frictional nonsliding contact with the capstan surface and to draw tape from the head and capstan. The present invention is largely directed to improvements in the foregoing type of transport, which enables its effective employment at very high tape accelerative levels and speeds.

In order to rapidly accelerate the tape without slippage, the frictional force between capstan and tape must be adequately high. High friction may be attained by providing a tape path of high tension, but high tension leads to many problems including high friction at the tape guides and consequent heating, greater danger of tape breakage, greater wear of the tape and guides, and the greater possibility of uneven tension on opposite sides of the capstan and consequent tape creep when stopped. Thus, it is desirable to provide adequately high capstan-to-tape friction with a relatively low tension tape path. Additionally, because the system is bidirectional, friction and other effects must be substantially alike in both directions of tape movement. Even the relatively minute frictional and inertial effects introduced by such elements as magnetic heads, roller guides and tape cleaners can become of substantial significance in a high performance system.

Another means for improving capstan-to-tape contact resides in increasing the tape wraparound angle about the capstan. To do this beyond a certain degree, however, requires that the tape be confined to an at least partially tortuous path. This in turn increases tape friction and the tendency toward unbalanced forces, and introduces limiting factors on system performance.

One danger that must be guarded against in the operation of a tape transport system is tape skew, or misalignment, which must be minimized particularly where large data storage density is employed. If the tape is skewed or misaligned, with respect to the head, the head portion at one side of the tape may be reading from one frame multi-bit character while the head portion at the other side reads from the next frame. While tape skew is important at all speeds, special care must be taken to eliminate it at high tape speeds and accelerations where large force impulses are encountered tending to cause skew.

Accordingly, one object of the present invention is to provide a tape transport of high performance capability.

Another object is to provide a tape transport of the controlled capstan drive type, which is characterized by a low tension, low friction tape path and high tape acceleration capacity.

Still another object is to provide a tape transport of the controlled capstan drive type which is characterized by high speed tape movement past a tape head, with minimal tape skew.

Yet another object is to provide a high performance tape transport which is characterized by accurate tape path guidance and gentle tape handling.

A still further object is to provide a tape transport having efficient tape cleaning capability.

These and other objects are attained by a tape transport of the type employing a closely controlled capstan drive, wherein special guides are provided to increase tape wrap about the capstan so that the capstan can apply large tape driving forces to tape in a low tension tape path. Certain of the dimensions and other characteristics of the tape path and guiding elements placed therealong are uniquely chosen for optimum high performance capabilities, including accurate tape guidance past the head.

In accordance with one feature of the invention, a large tape wrap about the capstan is provided by employing a pair of wrap guides which lead tape onto and from the capstan. The effective wrap distance between the wrap guides is less than the diameter of the capstan so that more than 180° wrap is attained. In order to reduce friction and wear on the oxide coating side of the tape which faces the wrap guides, air guides are used which "float" the tape on an air film past the guides. Lateral positioning of the tape is controlled by guides which exert a biasing force on the tape edge to overcome lateral displacements. Tape tension is provided by the suction of vacuum chamber buffers positioned along the tape path, the suction being adjusted so as to provide the minimum tension which reliably prevents tape slippage on the capstan. For high performance operation, the tape tensions are held within a narrow range of values, and the dimensions of various guides located between the buffer and the wrap angles of tape about the guides are also held close to particular values.

The invention also provides a tape cleaner to remove oxide accumulations and foreign particles from the tape which is arranged so as to achieve high cleaning efficiency while causing a minimum of frictional tape drag. The cleaner includes a number of holes connected to a vacuum source for drawing off oxide particles, and also includes a side bleed hole. Air flow is increased by the bleed hole, thereby providing a turbulent air flow increasing cleaning efficiency. Additionally, the bleed hole reduces the degree of vacuum in the cleaner chamber and thus decreases the normal force on the tape, so that the tape is pulled with less force against the cleaner and less friction and tape wear occurs.

The foregoing and other features of the invention and a more complete understanding thereof will be had from the following description and claims taken in conjunction with the accompanying drawings wherein:

Figure 1:
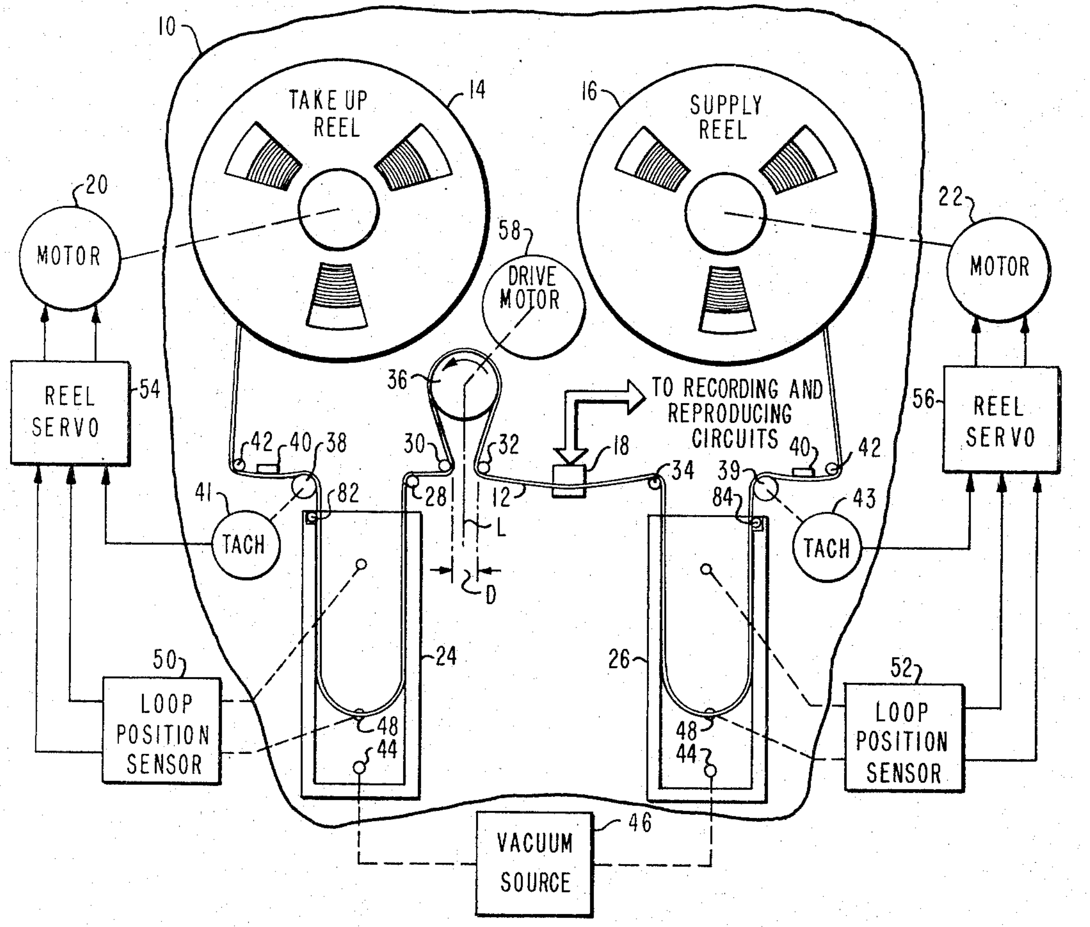
FIGURE 1 is a simplified view of a tape transport constructed in accordance with the invention.

Referring now to the figures, all of the principal elements of a tape transport constructed in accordance with the invention are shown, although associated elements not essential to an understanding of the invention are omitted in order to simplify the description. The principal operative elements of the tape transport are mounted on a front panel 10, shown only in generalized form. Tape 12 is moved in either direction along a controlled path between a takeup reel 14 and supply or file reels 16, and past a magnetic head assembly 18 which is coupled to recording and reproducing circuits. Separate drive motors 20 and 22 for the takeup and supply reels are coupled directly to the reels behind the panel 10, but are shown as physically displaced for clarity.

Between the two reels 14 and 16, the tape path is defined by a pair of low inertia buffer and tension devices such as vacuum chambers 24 and 26, a group of tape guides 28, 30, 32 and 34, and a capstan 36. Between each vacuum chamber 24 or 26 and associated reel 14 or 16, the tape path passes tachometer pulleys 38 and 39 connected to reel servo tachometers 41 and 43, a tape cleaner 40, air guides 42, and air guides 82 and 84.

Each of the vacuum chambers 24 and 26 is of substantially constant cross section and includes a terminating vacuum inlet port 44 coupled to a vacuum source 46. One or more loop position sensing means 48 are located within each chamber at selected points along the length of the chamber. A sensing device 50 or 52, such as a photoelectric device, differential pressure device, or other well known means is mounted at or coupled to each sensing position to detect loop length. Output signals from the loop position sensing devices 50 and 52 are coupled to reel servos 54 and 56 to control the separate reel motors 20 and 22. The tachometers 41 and 43 are also connected to the reel servos 54 and 56, which provide the equivalent of proportional speed control of the motor to maintain control of loop length. Various other similar expedients for controlling the reel motors are known to those in the art and accordingly have not been described in detail.

The tape path extending between the vacuum chambers 24 and 26 is of greatest interest inasmuch as this portion includes the magnetic head assembly 18. A low but closely controlled tension is maintained by reason of the vacuum pull of the chamber, thereby enabling the capstan 36 to engage the tape and move it in a closed controlled manner.

The capstan 36 is preferably constructed with a highly frictional surface as by providing a rubber or rubber covered element. The surface may be slightly resilient, but should be substantially undeformed by the tape at the tensions employed. The capstan is directly coupled to a low inertia motor 58 which is capable of providing high torques to rotate the capstan bidirectionally with high accelerations in accordance with start-stop commands. In one practical example, a capstan of approximately 2½ inch diameter is used to accelerate and decelerate the tape to or from a speed of 120 i.p.s. within a standard interrecord gap length. A sufficiently high tension must be maintained in order to prevent slippage of the tape over the capstan. However, high tension leads to the several disadvantages mentioned above. There is also the likelihood that tension differences will cause slow tape movement or creep past the capstan when the capstan is nominally at rest. The more serious disadvantage accompanying the employment of high tape tension is the greater friction which is introduced.

The frictional driving force which the capstan 36 applies to the tape is dependent upon the angle of tape wrap, and in accordance with the well known formula:

$$F=T(e^{u\theta}-1) \qquad (1)$$

where F is the frictional driving force applied to the tape, T is the nominal tape tension, $e$ is the base of the natural logarithm which is approximately 2.718, $\theta$ is the angle of tape wrap about the capstan, and $u$ is the coefficient of friction between the tape and the capstan surface.

In accordance with the present invention, large driving force is obtained by providing tape wrap guides 30 and 32 which produce a large tape wrap angle about the capstan 36. The portions of the guide surfaces which contact the tape are spaced apart by a distance D which is less than the diameter of the capstan 36 so that more than 180° tape wrap is obtained. While it is generally preferable to position the wrap guides 30 and 32 at equal distances from the capstan, they may be positioned at unequal distances and still provide greater than 180° capstan tape wrap. The wrap guides must, however, be spaced apart along directions perpendicular to an imaginary line L drawn from the capstan axis and extending midway between the guides, by a distance D which is less than the diameter of the capstan. The wrap guides are thus spaced apart an effective wrap distance of less than the capstan diameter.

Figure 2:
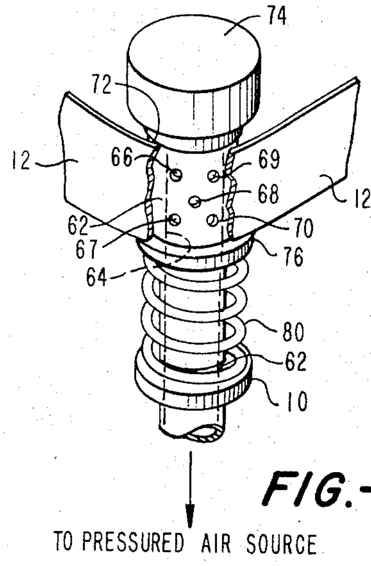
FIGURE 2 is a perspective fragmentary view of an air guide used in the tape transport of FIGURE 1.

The guides 28, 30, 32 and 34 are each constructed and disposed so as to provide a minimum of friction and tape skew. Each guide, shown in detail in FIGURE 2, comprises a base 60 fixed to a shaft 62 over which the tape 12 moves. The center of the shaft is formed as a conduit 64 and is connected to a source of pressured air (not shown). Five apertures 66, 67, 68, 69 and 70 coupled to the conduit 64 emanate air that forms an air film between the shaft 62 and tape to eliminate sliding friction between tape and guide body. The use of an air film for attaining a minimum of friction, instead of rotatable guides mounted on ball bearings or similar means, results in a tape guide without inertia. A rotatable guide has a small but appreciable inertia force at high acceleration and there is a possibility that the tape will not remain taut when it is accelerated very rapidly toward a rotatable guide, but instead will begin to buckle in the section between the capstan and that guide toward which the tape is moved.

Accurate tape movement is provided by guiding one tape edge against a fixed shoulder 72 that is part of a cap 74 on the shaft, and by guiding the other edge by a moveable washer 76. The washer is urged against the tape by a spring 80. The washer 76 serves to continually urge the tape against the flange 72, so as to always reference the tape position regardless of irregularities in tape width and tape waviness. Accurate positioning of the tape is important in preventing tape skew or misalignment and consequent inaccurate data reading where multiple track recording is employed, as mentioned above, particularly in the case of those guides 32 and 34 located on either side of the head 18.

It has been found that certain of the elements and their relationships are highly critical to the proper operation of the described tape transport. The performance characteristics obtainable with proper construction include operation with standard recording tape, generally 1 or 1½ mils thick and ¼ to 1 inch wide, at speeds of the order of 120 i.p.s., and at accelerations which enable attainment of full speed from rest within 0.225 inch. This performance has been obtained with an approximately 2.5 inch diameter capstan having a perimeter of rubber material, by providing a capstan wrap angle of approximately 220° and a tape tension of approximately 8 ounces. The use of a wrap angle of 220° enables the capstan to apply a driving force which is approximately 24% greater than attainable with 180° wrap, assuming a value of 0.3 for $\mu$ in accordance with Equation 1; an angle somewhat less than 180° has been the largest wrap angle known to be used in prior closely controlled capstan drive type tape transports.

The tape tension is generally required to be between 6 and 10 ounces for reliable operation. At 3 ounces tension, slippage over the capstan generally occurs, and between 4 and 6 ounces slippage sometimes occurs. At excessive tape tensions increased friction becomes more troublesome. The dimensions and relative placements of the air guides has been found to be important in attaining high performance operation. In the case of the two guides 32 and 34 which guide the tape directly onto the head, the construction and placement is highly critical. As previously mentioned, tape skew must be kept to an absolute minimum, inasmuch as the highest permissible density of recorded data is governed by the minimum of skew, or misalignment, which can be reliably maintained. The optimum construction, utilized to obtain the performance previously described, employs tape wrap angles of 100° about each of the guides 32 and 34 in this configuration. The guide portions of guides 32 and 34 which contact the sides of the tape have a radius of curvature of 0.25 inch which is obtained with a cylindrical guide shaft 62 of 0.5 inch diameter. The spring 80 which urges the washer 76 against the edge of the tape has a pre-load of 0.5 ounce. This arrangement does not introduce such high wrap angles that the tape path is made tortuous or restricted, and provides a compact overall structure in which the chambers are parallel. On the other hand, the wrap angles about the guides 28, 30, 32, 34 are also controlled in another important respect which is related to guide diameter. The wrap per unit length (of tape) is sufficiently large to insure adequate tape stiffness in the transverse direction. Here a value of approximately 250° per inch of tape length is employed to obviate tape buckling under the urging force of the spring 80.

The proper wrap angle, guide diameter, and spring preload are important in assuring that the washer 76 makes sufficient contact with the tape to urge a tape edge against the flange 72. The urging force must be sufficient to always permit the washer 76 to be able to follow the waviness of tape edge and must be small enough to move the tape laterally in a gentle manner without damaging tape edge even at the very high tape speeds employed. The proper construction and placement of the guides 28 and 30, while generally not as critical as for the other air guides adjacent the tape head, is of importance in attaining high performance operation. Tape wrap angles of 90° about each of the guides 28 and 30 and 0.5 ounce spring load have been found to be optimum.

Careful guiding of tape along the paths lying on the reel sides of the vacuum chambers 24 and 26 is generally not as critical as guiding between the chambers. However, the tape does move at very high speeds and with relatively high accelerations, and careful guidance is desirable. Fixed guides 82 and 84 are used to guide the tape from the vacuum chambers onto each of the tachometer pulleys 38 and 39. The wrap angle about the fixed guides is small, generally less than 15°, so that only sufficient contact with the tape is provided to assure transverse stiffness for guiding purposes. The small wrap angle results in low and negligible friction, and enables the use of the simpler, more economical, and more reliable fixed guides which generally comprise a stationary cylindrical rod with flanges.

Figure 3:
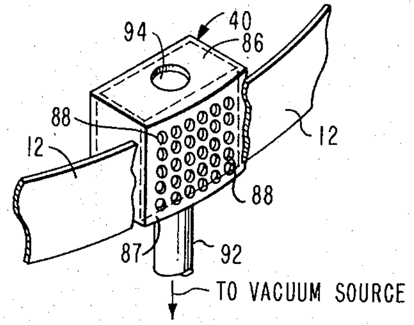
FIGURE 3 is a perspective fragmentary view of a tape cleaner used in the tape transport of FIGURE 1.

Tape cleaners 40 are provided to remove loose oxide and foreign particles from the tape without substantial friction. Each cleaner, shown in detail in FIGURE 3 comprises a housing 86 having a tape engaging surface 87 with an array of apertures 88, the edges of which define tape cleaning surfaces. The apertures 88 are connected to a conduit 92 which leads to a vacuum source. A side bleed hole 94 opens to the ambient atmosphere and substantially increases the air flow through the cleaner 40. The suction force from the vacuum creates a turbulence inside the chamber to keep particles suspended and thus removes oxide and foreign particles, as the tape is held against the tape engaging surface 87. The bleed hole 94 reduces the pressure differential across the tape and therefore reduces the frictional drag on the tape, while also minimizing the possibility of damage to the oxide coating. The tape cleaner 40 also acts against gravity, so that the turbulent action is of particular benefit.

While a particular arrangement of a tape transport has been described in detail, and while certain arrangements thereof have been described as important for optimum performance under particular circumstances, it will be appreciated that a number of modifications and alternative arrangements are possible. Accordingly, the invention should be considered to include modifications, variations and alternative forms falling within the scope of the appended claims.

We claim:

1. A tape transport comprising: a pair of tape reels and a tape path extending therebetween; a pair of buffer means disposed along said tape path; a tapehead disposed along said tape path between said pair of buffer means; a driven capstan of predetermined diameter disposed for frictional tape contact, said capstan being located along said tape path between one of said buffer means and said tape head; a pair of tape wrap guides disposed along said tape path on either tape-path side of said capstan, said guides including edge guiding means for the tape and tape engaging sufaces spaced apart a distance which is substantially less than the diameter of said capstan so as to provide greater than 180° tape wrap about said capstan, and at least a third guide disposed along said tape path adjacent the buffer means on the opposite side of the tape head from said capstan and including a tape engaging surface about which the tape is turned in passing to the adjacent buffer means.

2. A tape transport as defined in claim 1 wherein: said tape engaging surfaces are stationary and include apertures and air conduit means connected to said apertures for injecting an air film between said tape and said engaging surfaces, whereby to provide a low friction, low inertia tape path, and wherein said buffer means apply a tape tension of approximately eight ounces to said tape and the tape wrap angle about said capstan is approximately 220°.

3. A tape transport comprising: a pair of tape reels defining the end points of a tape path extending therebetween; a first and second buffer means disposed along said tape path; a tape head disposed along said tape path between said first and second buffer means; a bidirectional direct drive capstan of predetermined diameter disposed along said tape path between said head and said first buffer means; first and second tape guides disposed along said tape path on either tape-path side of said capstan and including tape engaging surfaces spaced an effective wrap distance less than the diameter of said capstan for providing more than 180° tape wrap about said capstan, said second tape guide located between said capstan and said head; and a third tape guide disposed between said head and said second buffer means, said second and third tape guides having rounded tape engaging surfaces of approximately 0.25 inch radius disposed for approximately 100° tape wrap, flange means for engaging a first tape edge to reference its position, and moveable washer means spaced from said flange by a distance approximately equal to the width of said tape and biased toward said flange means.

4. A tape transport comprising: a pair of tape reels and a tape path extending there between; a pair of buffer means disposed along said tape path and including balanced tape tension applying means for drawing tape toward each of said buffer means with a tension of more than about four ounces; a tape head disposed along said tape path between said buffer means; a controlled drive capstan of predetermined diameter disposed along said tape path between said tape head and one of said buffer means; a final pair of tape wrap guides having tape engaging surfaces, said guides being disposed along said tape path on either tape-path side of said capstan, and being air bearing members having spring means acting against a longitudinal edge of the tape, the cross-sectional dimension of the guides and the wrap angle about the guides being selected such that the wrap angle per inch of tape length is approximately 250°, the effective distance between said tape engaging surfaces of said pair of wrap guides being less than the diameter of said capstan, to provide greater than 180° tape wrap about said capstan, and the positions of said buffer means relative to said tape wrap guides being such as to provide substantial tape wrap about each of said guides.

5. In a tape transport for moving magnetic tape having sides and first and second opposite edges, which includes a controlled driven capstan and a tape head, the improvement comprising: a pair of tape guides disposed along said tape path, one of said guides being disposed between said capstan and said head, and the other of said guides being on the opposite side of said capstan from said head, each of said guides including tape side engaging surface and the tape being wrapped about each of said guides with a substantial angle, and each of said guides also having a fixed flange means jutting out from said engaging surface for abutting a first tape edge to reference its position, a movable washer means disposed for biasing against a second tape edge opposite said first tape edge for maintaining said first tape edge in engagement with said flange means, a cross-sectional dimension and wrap angle of tape selected such that the wrap angle per inch of tape length is in excess of approximately 200°, and conduit means formed in each of said tape guides and extending to said tape side engaging surface for conducting gas to said engaging surface and depositing a gas film between said tape side and said engaging surface whereby tape movement from said capstan to said tape head is accomplished with a minimum of tape misalignment and skew at said tape head.

6. In a tape transport for moving tape having sides and edges, which includes a closely controlled driven capstan and a tape head, the improvement defined in claim 5 wherein: said tape side engaging surface has a radius of curvature of approximately 0.25 inch and said guide is disposed for a total tape wrap about said engaging surface of approximately 100°, whereby the contact of said washer with said second edge of said tape is made over a sufficient tape length to provide optimum tape guidance without transverse buckling.

References Cited

UNITED STATES PATENTS

| | | | |
|---|---|---|---|
| 2,778,634 | 1/1957 | Gams et al. | 226—95 |
| 2,984,398 | 5/1961 | Chalmers | 226—97 X |
| 3,112,473 | 11/1963 | Wicklund et al. | 226—95 X |
| 3,125,265 | 3/1964 | Warren et al. | 226—95 X |
| 3,134,528 | 5/1964 | Dickey | 226—97 |
| 3,187,971 | 6/1965 | Miller et al. | 226—95 |

FOREIGN PATENTS

| | | |
|---|---|---|
| 467,154 | 6/1937 | Great Britain. |
| 1,064,699 | 9/1959 | Germany. |

OTHER REFERENCES

Kochenburger, R. J., tape reel drive control, in IBM Tech. 1 (5): p. 24, February 1959 TK 7800. I 13. Disclosure Bul.

ROBERT B. REEVES, *Primary Examiner.*